Sept. 18, 1962  J. RUHRMANN ETAL  3,054,171
METHOD OF MAKING SLIDE FASTENERS
Original Filed Oct. 22, 1956  7 Sheets-Sheet 1

INVENTORS
JOSEF RUHRMANN
KURT STREICHER
ERNST POPOVITSCH
BY Michael S. Striker
ATTORNEY Sept. 18, 1962   J. RUHRMANN ETAL   3,054,171
METHOD OF MAKING SLIDE FASTENERS
Original Filed Oct. 22, 1956   7 Sheets-Sheet 2

INVENTOR:
JOSEF RUHRMANN
KURT STREICHER
ERNST POPOVITSCH
BY: Michael S. Striker
    agt Sept. 18, 1962 J. RUHRMANN ETAL 3,054,171
METHOD OF MAKING SLIDE FASTENERS
Original Filed Oct. 22, 1956 7 Sheets-Sheet 7

INVENTORS
JOSEF RUHRMANN
KURT STREICHER
ERNST POPOVITSCH

BY
ATTORNEY

United States Patent Office 3,054,171
Patented Sept. 18, 1962

3,054,171
METHOD OF MAKING SLIDE FASTENERS
Josef Ruhrmann, Kurt Streicher, and Ernst Popovitsch, all of Stuttgart, Germany, assignors to Talon, Inc., Meadville, Pa.
Continuation of abandoned application Ser. No. 617,336, Oct. 22, 1956. This application Mar. 9, 1961, Ser. No. 94,646
Claims priority, application Germany Oct. 21, 1955
11 Claims. (Cl. 29—410)

This invention relates to slide fasteners, and more particularly, to a method of making stringers for slide fasteners.

This application is a continuation of our pending patent application, Serial No. 617,336, filed October 22, 1956, entitled "Making Slide Fasteners," now abandoned.

One of the objects of the present invention is to provide an economical process for quickly manufacturing a stringer which includes scoops formed from a continuous filament having the properties or characteristics of wire.

Another object of the present invention is to provide a process of the above type which guarantees that the scoops of the stringer will remain in their proper operating positions.

Still another object of the present invention is to provide a process for making a stringer wherein the scoops are protected from the influence of temperature changes and wherein the stringer itself may have a portion which covers the slide fastener structure.

With the above objects in view, the present invention mainly consists of a process for manufacturing a stringer for a slide fastener, this process including the step of bending a filament having the properties of wire into a zigzag configuration having a series of ladder-like transverse portions interconnected by a series of longitudinal portions alternately located at opposite sides of the bent filament. After the latter step is performed, the following steps are performed in any desired sequence: fastening the bent filament at least at parts of the transverse portions thereof which are adjacent to its longitudinal portions to a band means which is composed at least in part of a tape; bending the series of ladder-like transverse portions all in the same direction respectively into scoops which are substantially U-shaped at least at intermediate portions thereof; and forming heads substantially at the centers of the ladder-like transverse portions, respectively.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
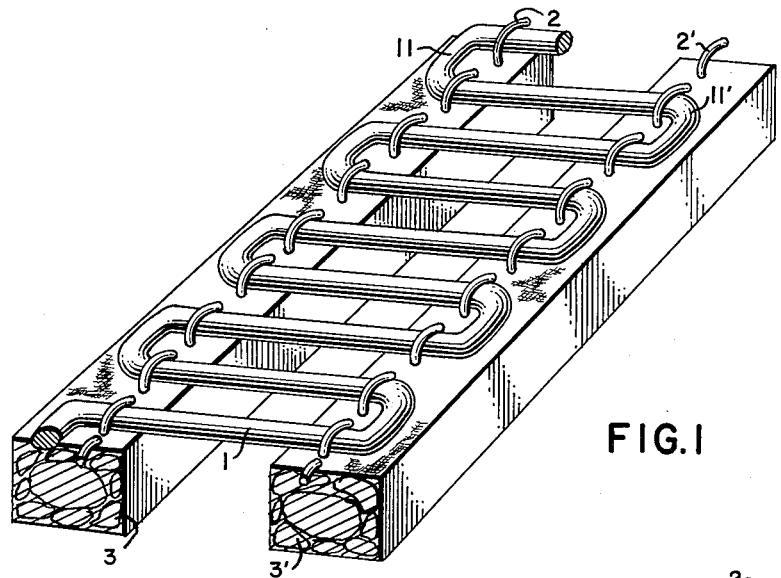
FIG. 1 is a fragmentary perspective view illustrating one stage in the process of manufacture of a stringer according to the present invention.
Figure 2:
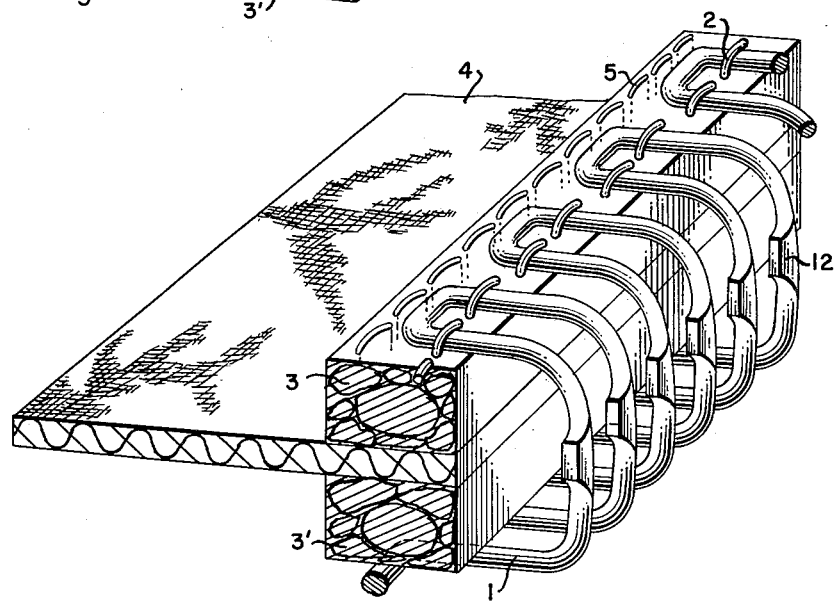
FIG. 2 shows the completed stringer formed according to the process shown in FIG. 1, FIG. 2 being a fragmentary perspective view also.

Referring now to the drawings and to FIGS. 1 and 2 in particular, according to the process of the invention an elongated filament 1 which has the properties of wire is bent into the zigzag configuration shown most clearly in FIG. 1. The filament 1 may be a wire or it may be made of a plastic material having the properties of wire, such as, for example, glass, styrene, or nylon.

As is apparent from FIG. 1, the continuous filament 1 is bent into a zigzag configuration which is provided with a series of transverse spaced-apart ladder-like portions interconnected at opposite sides of the bent filament by a series of longitudinal portions 11 and 11' which are alternately located at opposite sides of the zigzag filament.

After the filament is formed into the zigzag configuration indicated in FIG. 1, it is placed at opposite sides thereof on a pair of cords 3 and 3', as shown in FIG. 1, and then the transverse portions of the filament which are adjacent to the longitudinal portions 11 and 11' are fastened to the cords 3 and 3' as by being sewn thereto with the stitches 2 and 2', respectively.

Thereafter, according to the process of the present invention, the transverse portions of the filament are all bent in the same direction into a substantially U-shaped configuration so as to provide a series of spaced-apart substantially U-shaped scoops, which are clearly illustrated in FIG. 2. It will be noted that the direction of bending of the transverse filament portions is such that the cords 3 and 3' are directed toward each other and become located in the longitudinal space between the lateral portions of the scoops. The tape 4 is located between the cords 3 and 3', and then the cords and tape are fastened together by means of the stitching 5, for example.

The transverse ladder-like portions of the filament 1 are pressed or otherwise formed so as to have the heads 12 shown in FIG. 2. It will be noted that the scoops are of substantially U-shaped configuration at intermediate parts thereof, at least. Furthermore, it should be noted that after the filament is bent into the zigzag configuration indicated in FIG. 1, the remaining steps described above may be carried out in any desired sequence. Thus, the heads 12 may be formed on the transverse portions of the filament before the latter is attached to the cords 3 and 3', or after the filament is attached to the cords 3 and 3' and before the transverse filament portions are bent so as to provide the scoops. Also, it is possible to provide the heads after the scoops are formed. Also, it is possible to bend the transverse portions of the filament so as to form the scoops, and then the lateral portions of the scoops may be attached to the cords which are then attached to the tape 4 in the manner described above. It will be seen that the stitches 2 and 2' are located relatively close to longitudinal portions 11 and 11' of the filament, so that the possibility of shifting of the scoops with respect to the cords 3 and 3' is reduced to a minimum.

Figure 3:
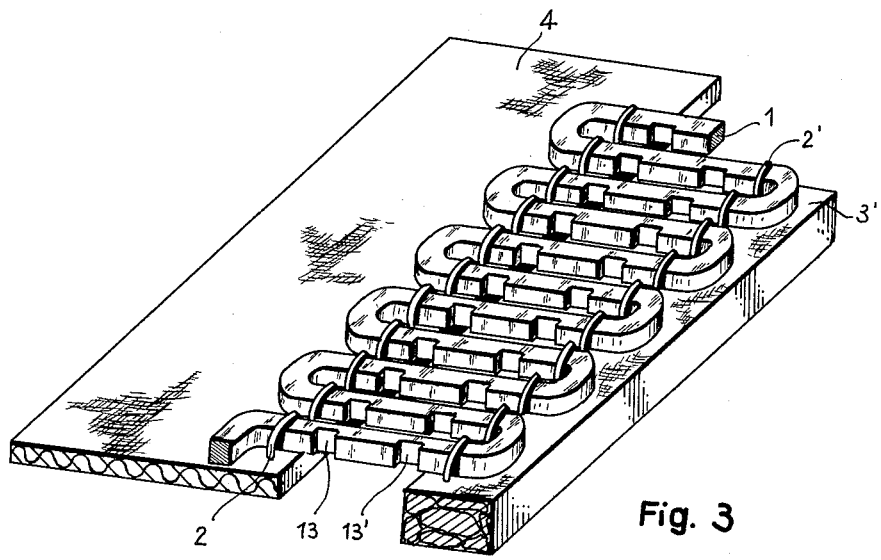
FIG. 3 is a fragmentary perspective view illustrating a stage in another embodiment of a process according to the present invention.
Figure 4:
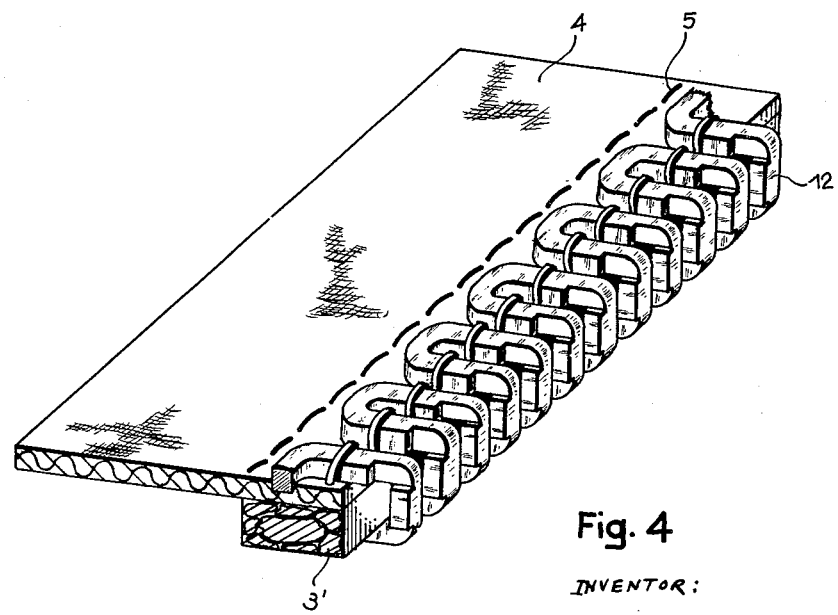
FIG. 4 is a fragmentary perspective view of a stringer completed from a process which includes the stage shown in FIG. 3.

According to the embodiment of the invention which is shown in FIGS. 3 and 4, the filament 1 has a rectangular configuration and is provided with the notches 13 and 13' at each of the transverse portions of the zigzag filament, as is indicated in FIG. 3. With this embodiment of the invention, a cord 3' is attached by the stitching 2' to one side of the zigzag filament, while the tape 4 is attached to the longitudinal portions at the other side of the filament, as indicated in FIG. 3. Now when the transverse filament portions are bent so as to provide the scoops indicated in FIG. 4, the tape 4 and the cord 3' will be located next to each other in the manner shown in FIG. 4, and these elements may be attached to each other by the stitching 5. As was pointed out above, the heads 12 may be formed on the scoops at any time after the wire has the zigzag configuration shown in FIG. 3, and furthermore it is possible to provide the scoops shown in FIG. 4 before the filament is attached to the cord and tape. Thus, with the embodiment of FIGS. 3 and 4 only one cord is required, and furthermore the notches 13 and 13' facilitate the bending of the transverse portions of the filament so as to form the scoops which are shown in FIG. 4.

Figure 5:
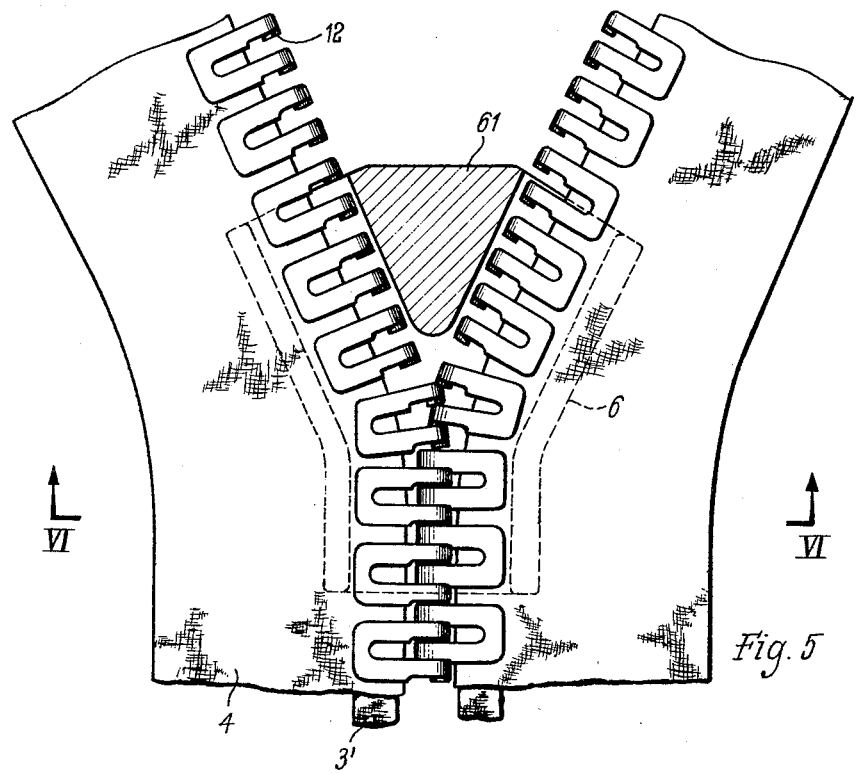
FIG. 5 is an elevational view illustrating a pair of stringers having the construction shown in FIG. 4 in operative relation with each other and shown in cooperation with a slider.
Figure 6:
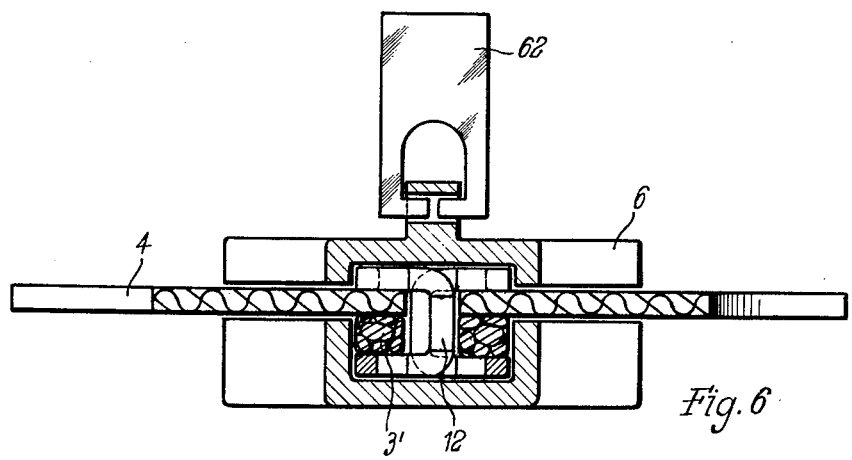
FIG. 6 is a sectional view taken along line VI—VI of FIG. 5.

FIGS. 5 and 6 illustrate the manner in which a pair of stringers having the construction shown in FIG. 4 cooperate with each other. Thus, the slider 6 is shown with the scoops guided in the rails thereof, and the pull 62 of the slider 6 is clearly shown in FIG. 6. FIG. 5 shows the diamond 61 of the slider 6. As is apparent from FIGS. 5 and 6, the heads 12 of the scoops of one stringer enter into the pockets formed by the scoops of the other stringer.

Figure 7:
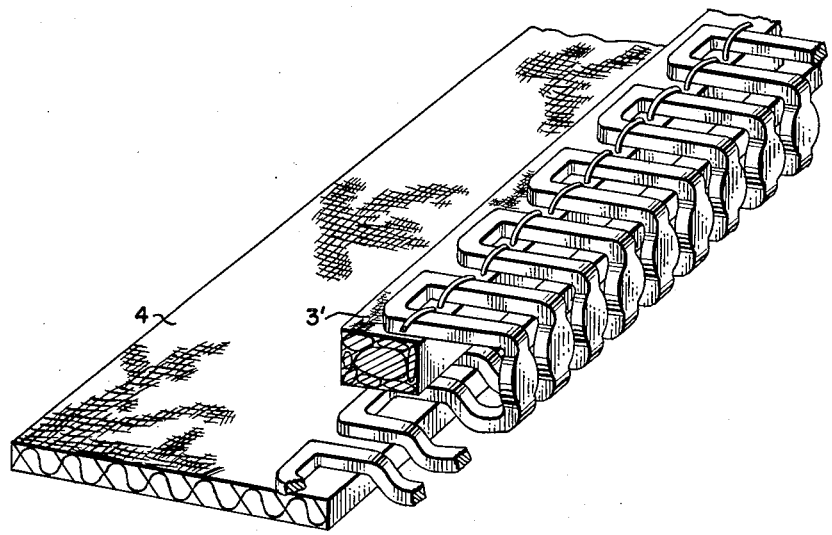
FIG. 7 is a perspective fragmentary view of another embodiment of the stringer made according to the present invention.

The embodiment of the invention which is illustrated in FIG. 7 is similar to that of FIGS. 3 and 4 except that the cord 3' and the tape 4 are joined to opposite faces of the zigzag filament. The transverse filament portions are bent to form the scoops shown in FIG. 7 in a direction which locates the cord 3' in the longitudinal space between the lateral portions of the scoops, and it will be noted that the heads of the scoops of FIG. 7 have a configuration different from the heads 12 of FIGS. 3 and 4. The tape 4 is located at the exterior of the longitudinal space between the lateral portions of the scoops, and the tape 4 may be joined to the cord 3' by suitable stitching after the scoops are formed.

Figure 8:
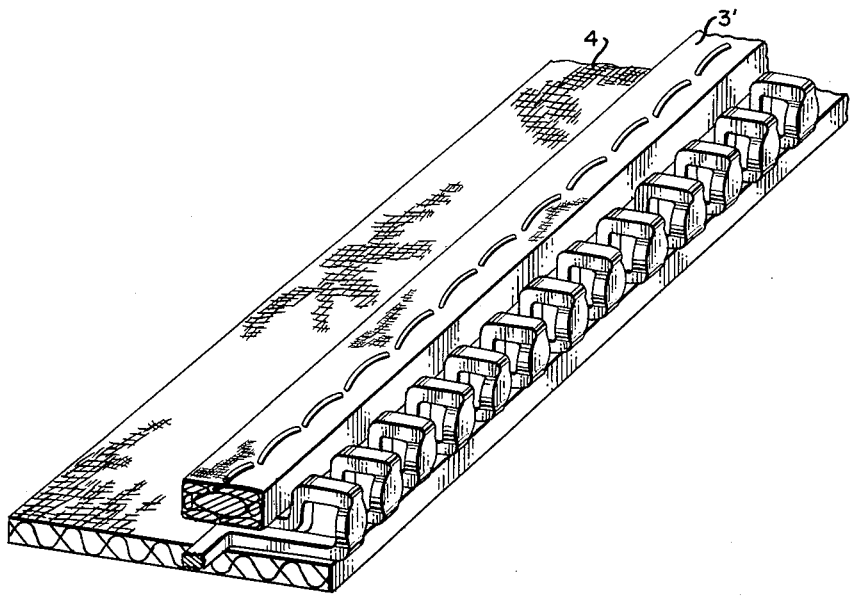
FIG. 8 is a fragmentary perspective view of still another embodiment of a stringer made according to the present invention.

According to the embodiment of the invention which is shown in FIG. 8, the tape 4 and the cord 3' are joined to the same face of the filament, as is the case with FIGS. 3 and 4, but the transverse portions of the filament are bent in a direction opposite to the direction of bending shown in FIG. 4, so that with the embodiment of FIG. 8 the tape 4 and the cord 3' are located at the exterior of the stringer. It will be noted that while the intermediate portion of each scoop of the embodiment of FIG. 8 still has a substantially U-shaped configuration, the end portions of the scoops are all located substantially in a common plane and are all located between the cord 3' and the tape 4 which are joined together and which serve to join the filament to the tape and cord. Furthermore, with the embodiment of FIG. 8 the right side edge of the tape 4, as viewed in FIG. 8, extends all the way up to the central portion of the scoops which carry the heads, so that with this embodiment of the invention the cord 3' not only cooperates with the slider to guide the same, but in addition the slide fastener will be covered by the tapes 4. When the filament is made of certain plastic materials, it may be important to protect the filament from temperature changes, and the covering of the filament both with the tape 4 and with the cord 3' in the manner shown in FIG. 8 serves to protect the filament from temperature changes.

Figure 9:
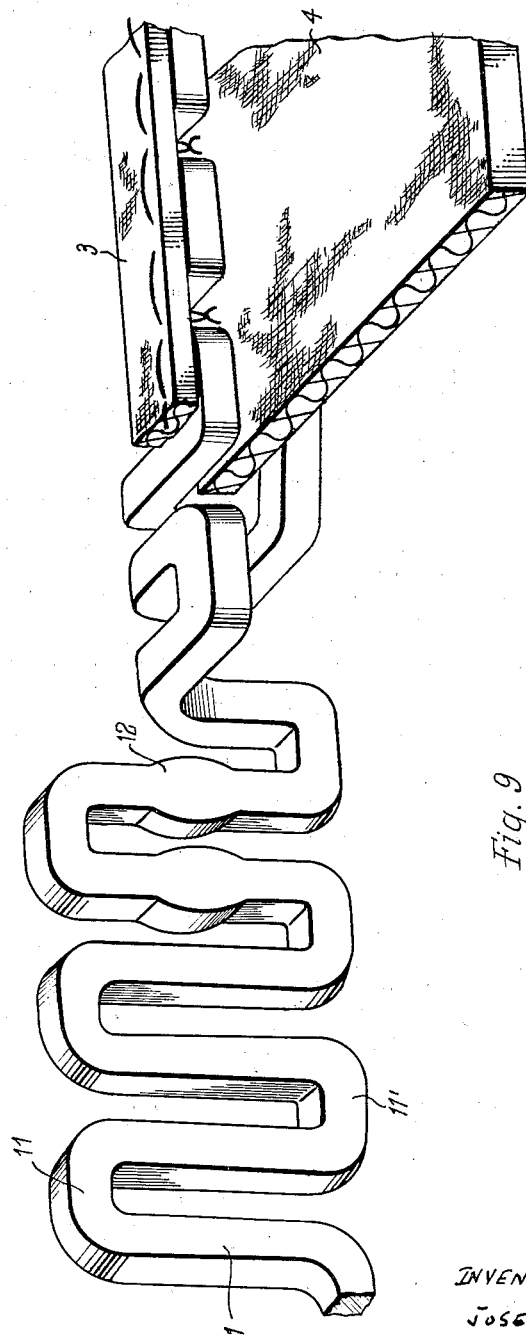
FIG. 9 is a perspective view illustrating a process for manufacturing still a further embodiment of a stringer according to the present invention.

According to the embodiment of the invention which is shown in FIG. 9, the zigzag filament 1 which is of rectangular configuration and which is formed with the heads 12 is bent at its transverse portions to form the scoops which are shown at the right portion of FIG. 9, and the tape 4 is placed in the longitudinal space between the lateral portions of the scoops while a single cord 3 is located at the exterior of the filament along the longitudinal portions at one side of the scoops. With this arrangement the tape 4 and the cord 3 may be joined to each other by suitable stitching and to the filament 1 in a single continuous step.

Figure 10:
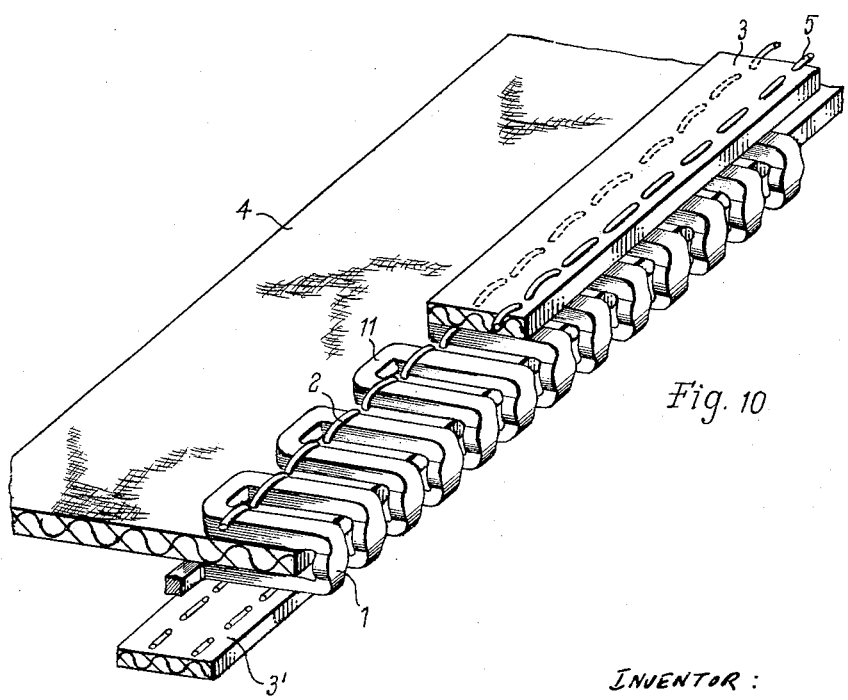
FIG. 10 is a fragmentary perspective view illustrating a further embodiment of a stringer according to the present invention.

FIG. 10 shows an arrangement where a tape 4 is also located in the longitudinal space between the lateral portions of the scoops, but with the embodiment of FIG. 10 the cords 3 and 3' take the form of strips of fabric which are placed at the outer faces of the filament in the manner shown in FIG. 10, and after the tape 4 is joined to the filament by the stitches 2, the stitches 5 serve to join the strips 3 and 3' to the tape 4. Thus, with the embodiment of FIG. 10 the filament will also be protected against temperature changes.

Figure 11:
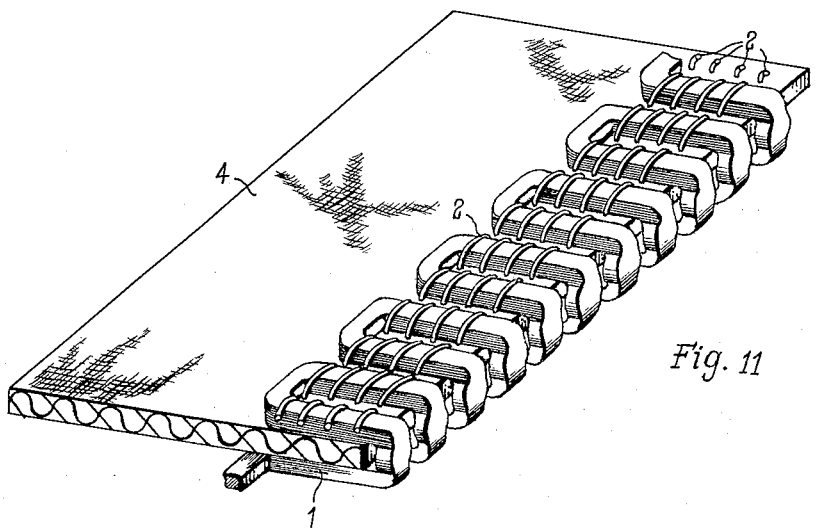
FIG. 11 is a fragmentary perspective view showing a still further embodiment of a stringer according to the present invention.

According to the embodiment of the invention which is shown in FIG. 11, no cords are used. The tape 4 is again placed in the longitudinal space between the lateral portions of the scoops, and then a series of stitches 2 are provided in order to fasten the filament to the tape 4. It will be noted that the stitches are arranged close together and substantially cover the lateral portions of the scoops, so that the covering provided by the stitches 2 also serve to protect the filament against temperature changes. It will be noted that the stitches 2 are always located close to the longitudinal portions 11 and 11' of the filament so as to prevent shifting of the filament with respect to the tape and cord.

Figure 12:
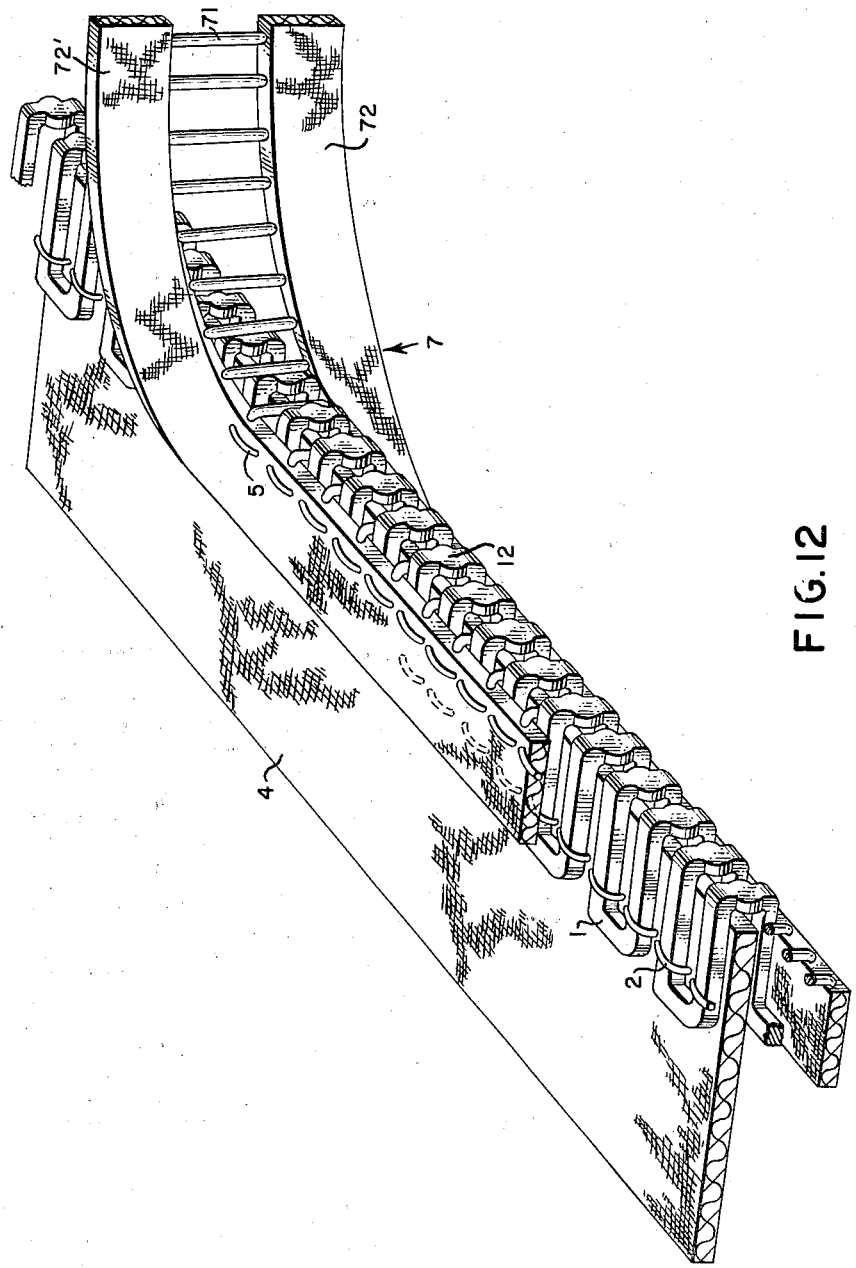
FIG. 12 is a fragmentary perspective view illustrating one more stringer according to the present invention as well as the process for manufacturing this stringer.

According to the embodiment of the invention which is shown in FIG. 12, the tape 4 is again placed in the longitudinal space between the lateral portions of the scoops, and the stitches 2 serve to fasten the tape 4 and the filament together. However, with the embodiment of FIG. 12, instead of a pair of fabric strips covering the lateral portions of the filament, as indicated in FIG. 10, a single fabric strip 7 is used, this fabric strip 7 having lateral portions 72 and 72' which respectively become located at the outer faces of the filament. These strip portions 72 and 72' are interconnected by yarns 71 which are exposed at an intermediate portion of the strip 7, so that the yarns 71 respectively become located between the successive scoops, while the strip portions 72 and 72' easily become placed against the outer surfaces of the filament and are then attached to the tape 4 in a continuous operation by the stitches 5.

It will be understood that each of the elements described above, or two or more together, may also find a useful application in other types of slide fasteners differing from the types described above.

While the invention has been illustrated and described as embodied in stringer for slide fasteners, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a process for manufacturing a stringer for a slide fastener, the steps of bending a filament having the properties of wire into a zigzag configuration having a series of spaced-apart ladder-like transverse portions interconnected by a series of longitudinal portions alternately located at opposite sides of the bent filament; bending said series of ladder-like transverse portions all in the same direction respectively so as to provide a series of spaced-apart substantially U-shaped scoops and so as to provide a longitudinal space between the longitudinal portions at the ends of the scoops; locating a tape in said space; placing a cord outside of said space along a series of longitudinal filament portions; fastening said tape and cord to each other and to the filament; and, at any time after the original filament is bent into said zigzag configuration, forming heads substantially at the centers of said transverse filament portions.

2. In a process for manufacturing a stringer for a slide fastener, the steps of bending a filament having the properties of wire into a zigzag configuration having a series of spaced-apart ladder-like transverse portions interconnected by a series of longitudinal portions alternately located at opposite sides of the bent filament; deforming the cross section of the filament only at the center region of said ladder-like transverse portions so as to form heads thereon, respectively; fastening the bent filament at least at parts of said transverse portions adjacent said longitudinal portions to a pair of cords respectively located at opposite sides of the bent filament and engaging the same face thereof; bending said series of ladder-like transverse portions respectively so as to provide a series of spaced-apart substantially U-shaped scoops and in a direction which locates said cords between said longitudinal portions of the bent filament; and placing a tape between said cords; and fastening said cords to said tape.

3. In a process for manufacturing a stringer for a slide fastener, the steps of bending a filament having the properties of wire into a zigzag configuration having a series of spaced-apart ladder-like transverse portions interconnected by a series of longitudinal portions alternately located at opposite sides of the bent filament; deforming the cross section of the filament only at the center region of said ladder-like transverse portions so as to form heads thereon, respectively; bending said series of ladder-like transverse portions all in the same direction respectively so as to provide a series of spaced-apart scoops which are substantially U-shaped at least at intermediate portions thereof; placing a tape along the longitudinal portions of said bent filament; placing at least one cover strip over the outer faces of the longitudinal filament portions and the transverse portions adjacent thereto; and fastening said tape and said cover strip to each other and to the filament.

4. In a process for manufacturing a stringer for a slide fastener, the steps of deforming a continuous filament having the characteristics of wire into a zigzag configuration so as to provide a series of spaced-apart ladder-like transverse portions successively interconnected by a series of longitudinal portions alternately located at opposite sides of the deformed filament, bending the deformed filament centrally of the ladder-like transverse portions so that the longitudinal portions on one side are disposed opposite those on the opposite side in staggered relation and substantially parallel to one another so as to provide a series of spaced-apart substantially U-shaped scoops, fastening the deformed filament at said ladder-like transverse portions to a tape adjacent the edge thereof, and, at any time, after the original filament is deformed into zigzag configuration, deforming the cross section of the filament at the center region of each of said ladder-like transverse portions so as to form interlocking means thereon.

5. In a process for manufacturing a stringer for a slide fastener, the steps of deforming a continuous filament having the characteristics of wire into a zigzag configuration so as to provide a series of spaced-apart ladder-like transverse portions successively interconnected by a series of longitudinal portions alternately located at opposite sides of the deformed filament, bending the deformed filament centrally of the ladder-like transverse portions so that the longitudinal portions on one side are disposed opposite those on the opposite side in staggered relation and substantially parallel to one another so as to provide a series of spaced-apart substantially U-shaped scoops, fastening the deformed filament at said ladder-like transverse portions to a tape adjacent the edge thereof by means of a continuous line of stitching, and, at any time, after the original filament is deformed into zigzag configuration, deforming the cross section of the filament at the center region of each of said ladder-like transverse portions so as to form interlocking means thereon.

6. In a process for manufacturing a stringer for a slide fastener, the steps of deforming a continuous filament having the characteristics of wire into a zigzag configuration so as to provide two series of spaced-apart ladder-like transverse portions disposed in juxtaposition in substantially parallel relation with the ladder-like transverse portions of one series being interconnected with those of the other series by means of intermediate substantially U-shaped scoop forming portions at one side thereof and the ladder-like portions of each series being successively interconnected by means of a series of longitudinal portions arranged substantially parallel to one another at the opposite side thereof with the longitudinal interconnecting portions of one series being staggered relative to the other series, placing a cord either outside or between the series of longitudinal portions, fastening said cord and said filament to each other and to a tape; and, at any time, deforming each of the U-shaped scoop forming portions so as to provide interlocking means thereon.

7. In a process for manufacturing a stringer for a slide fastener, the steps of deforming a continuous filament having the characteristics of wire into a zigzag configuration so as to provide two series of spaced-apart ladder-like transverse portions disposed in juxtaposition in substantially parallel relation with the ladder-like transverse portions of one series being interconnected with those of the other series by means of intermediate substantially U-shaped scoop forming portions at one side thereof and the ladder-like portions of each series being successively interconnected by means of a series of longitudinal portions arranged substantially parallel to one another at the opposite side thereof with the longitudinal interconnecting portions of one series being staggered relative to the other series, placing a cord either outside or between the series of longitudinal portions, fastening said cord and said filament to each other and to a tape by means of stitching; and, at any time, deforming each of the U-shaped scoop forming portions so as to provide interlocking means thereon.

8. In a process for manufacturing a stringer for a slide fastener, the steps of deforming a continuous filament having the characteristics of wire into a zigzag configuration so as to provide a series of spaced-apart ladder-like transverse portions successively interconnected by a series of longitudinal portions alternately located at opposite sides of the deformed filament, bending the deformed filament centrally of the ladder-like transverse portions so that the longitudinal portions on one side are disposed opposite those on the opposite side in staggered relation and substantially parallel to one another, placing a cord either outside or between the series of longitudinal portions, fastening the filament and said cord to each other and to a tape, and, at any time, after the original filament is deformed into zigzag configuration, deforming the cross section of the filament at the center region of each of said ladder-like transverse portions so as to form interlocking means thereon.

9. In a process for manufacturing a stringer for a slide fastener, the steps of deforming a continuous filament having the characteristics of wire into a zigzag configuration so as to provide a series of spaced-apart ladder-like transverse portions successively interconnected by a series of longitudinal portions alternately located at opposite sides of the deformed filament, bending the deformed filament centrally of the ladder-like transverse portions so that the longitudinal portions on one side are disposed opposite those on the opposite side in staggered relation and substantially parallel to one another, placing a cord either outside or between the series of longitudinal portions, fastening the filament and said cord to each other and to a tape by means of a continuous line of stitching, and, at any time, after the original filament is deformed into zigzag configuration, deforming the cross-section of the filament at the center region of each of said ladder-like transverse portions so as to form interlocking means thereon.

10. In a process for manufacturing a stringer for a slide fastener, the steps of deforming an elongated continuous filament having the characteristics of wire into a zigzag configuration so as to provide a series of spaced-apart ladder-like transverse portions successively interconnected by a series of longitudinal portions alternately located at opposite sides of the deformed filament, bending the deformed filament centrally of the ladder-like transverse portions so that the longitudinal portions on one side are disposed opposite those on the opposite side in staggered relation substantially parallel to one another so as to provide a series of spaced-apart substantially U-shaped scoop portions, deforming the cross-section of the filament at each of the U-shaped scoop portions centrally thereof, and attaching the ladder-like transverse portions along the edge of a tape.

11. In a process for manufacturing a stringer for a slide fastener, the steps of deforming an elongated continuous filament having the characteristics of wire into a zigzag configuration so as to provide a series of spaced-apart ladder-like transverse portions successively interconnected by a series of longitudinal portions alternately located at opposite sides of the deformed filament, bending the deformed filament centrally of the ladder-like transverse portions so that the longitudinal portions on one side are disposed opposite those on the opposite side in staggered relation substantially parallel to one another so as to provide a series of spaced-apart substantially U-shaped scoop portions, deforming the cross-section of the filament at each of the U-shaped scoop portions centrally thereof, and attaching the ladder-like transverse portions along the edge of a tape by means of continuous series of stitches positioned between said longitudinal portions and said U-shaped scoop portions.

No references cited.